K. T. BOUVIN.
APPARATUS FOR PREPARING AND DISTRIBUTING OF AERATED DRINKS OR SIMILAR FLUIDS.
APPLICATION FILED MAY 9, 1917.
1,246,227. Patented Nov. 13, 1917.
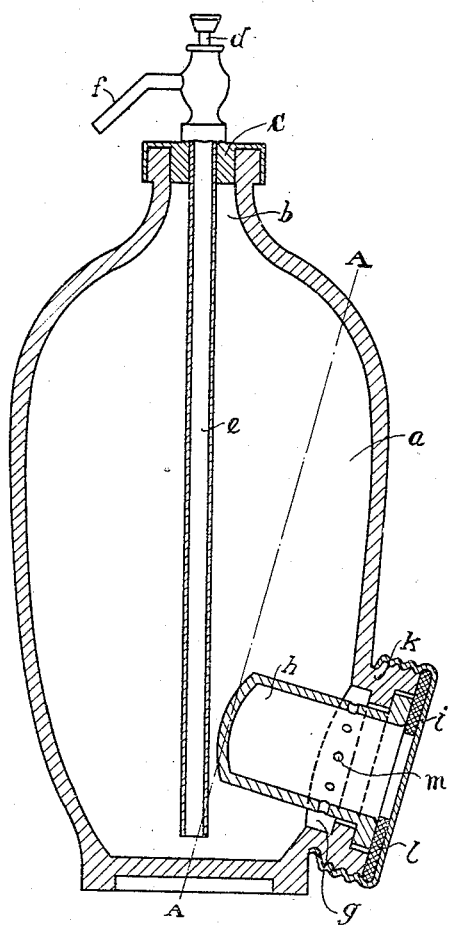
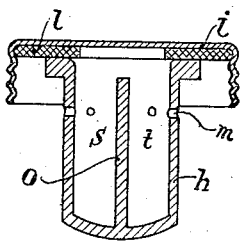
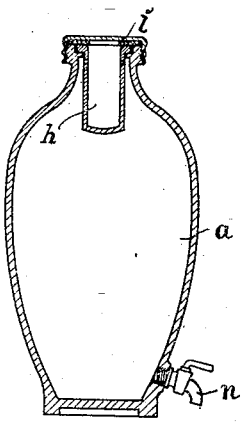
Inventor
Karl Thure Bouvin

UNITED STATES PATENT OFFICE.

KARL THURE BOUVIN, OF MÖLNDAL, SWEDEN, ASSIGNOR TO NYA AKTIEBOLAGET TERRACOTTA, OF MÖLNDAL, SWEDEN.

APPARATUS FOR PREPARING AND DISTRIBUTING OF AERATED DRINKS OR SIMILAR FLUIDS.

1,246,227.  Specification of Letters Patent.  Patented Nov. 13, 1917.

Application filed May 9, 1917. Serial No. 167,439.

*To all whom it may concern:*

Be it known that I, KARL THURE BOUVIN, a subject of the King of Sweden, residing at Mölndal, in the county of Gottenborg and Bohus and Kingdom of Sweden, have invented new and useful Improvements in Apparatus for Preparing and Distributing of Aerated Drinks or Similar Fluids, of which the following is a specification.

This invention relates to improvements in bottles or other containers for preparing and distributing aerated drinks such as mineral waters charged with carbonic acid or the like. In previously known devices of this kind, the aerated drinks have lacked freshness and flavor, owing in large measure to the fact that the carbonic acid is too quickly freed from the water when the container is uncovered for distributing the aerated drink, or to the fact that the aerated drink is not prepared under a higher pressure than that of the atmosphere. A further disadvantage in connection with these prior devices is that the salts and acids from which the carbonic acid gas is to be developed must generally be employed in solid form, and so dissolve too slowly to permit preparation of a beverage for use on the instant.

The object of this invention is to provide a special apparatus including a receptacle or container within which an aerated drink may be prepared in a cheap and convenient way, exactly as and when wanted, under an excessive pressure above that of the atmosphere; the apparatus being particularly adapted for family use in households or on travels and for satisfying similar smaller wants. The invention provides a container of the class mentioned in which the aerated drink may be produced instantly and in accordance with the particular need of the moment, so that the drink when served always possesses the highest degree of freshness.

In the accompanying drawings,

Figure 1 is a sectional elevation of an apparatus illustrating the invention;

Fig. 2 illustrates a somewhat modified construction of one of the parts shown in Fig. 1; and Fig. 3 illustrates a modified embodiment of the entire apparatus.

In carrying the invention into effect, there is provided a vessel or receptacle $a$, preferably of bottle shape and constructed of glass, china or the like. The receptacle $a$ has a discharge opening $b$ provided with a screw-cap $c$ or other suitable, readily-removable closure. If desired, the receptacle $a$ may be provided with a siphon $e$ having a discharge pipe or nozzle $f$, and a spring actuated valve $d$. Near its bottom the receptacle $a$ is provided with another opening $g$ through which a small vessel $h$ can be inserted into the receptacle $a$. Opening $g$ is surrounded by a sleeve or apron $k$ exteriorly threaded so that a metal cap $i$ may be screwed on the sleeve $k$ to clamp in place a suitable washer $l$ of rubber or the like to close the outer end of the small vessel $h$ and the joint between the small vessel and the receptacle $a$.

The walls of the small vessel $h$ must be adapted to allow the fluid in the receptacle to communicate with the contents of the small vessel, but at a rather slow rate. To this end the walls of the vessel $h$ are permeable. The vessel may be porous, such as would be the case with the vessel of ordinary non-glazed earthenware, or provided with perforations or small holes $m$, positioned near the outer end of the vessel $h$ for a purpose brought out below. The vessel $h$ shown in Fig. 2 will in some cases be found to increase the utility of the apparatus, this vessel having a partition wall $o$ dividing its interior into two chambers $s$ and $t$. The invention also contemplates that the vessel $h$ may be provided with two or more such partition walls for dividing the interior of the vessel into a corresponding number of chambers as desired.

It is not necessary that the cap $c$ and vessel $h$ be applied to the receptacle $a$ in the relation shown in Fig. 1; for instance, the cap and vessel may have their positions reversed, in which event, if desired, a discharge cock $n$ or the like may be substituted for the cap $c$, as illustrated in Fig. 3. It will be understood that the shapes and materials of container $a$ and vessel $h$ are not essential to the invention, provided the shapes and materials selected are adequate to withstand the gas pressures set up in the apparatus when in use.

When utilizing the apparatus, the receptacle $a$ is closed by the discharge cap $c$. The vessel $h$ is removed from the receptacle, and the latter is tilted on its side with the nozzle $f$ pointing down so that when a suitable quantity of liquid is admitted to the interior of the recepacle the liquid level will be that indicated by the line A—A. Water and salt for developing carbonic acid are then supplied to the receptacle and the liquid level rises to the line A—A, the vessel $h$, filled with the proper amount of water solution of the wine, lemon, or other selected acid, is passed through the opening $g$ and seated in place therein as illustrated. When the vessel $h$ is provided with one or more partition walls $o$, each of the chambers $s$, $t$, etc., formed thereby, may be supplied with a particular acid.

When the permeable walls of the vessel $h$ are of porous material, the material must be such that the contents of the vessel will not escape too rapidly into the receptacle $a$ but will be retained in the vessel until the vessel has been introduced into the receptacle and the screw cap $i$ has been applied to clamp the vessel in place in a fluid tight manner by means of the washer $l$. If the walls of the vessel $h$ are of a non-porous material, the holes $m$ must be positioned remote from the inner end of the vessel when inserted in the receptacle, so that the vessel may be supplied with and retain the necessary amount of acid solution before the vessel is clamped in place in the receptacle. When the cap $i$ is securely closed the receptacle $a$ is stood upright as shown in Fig. 1, and then the liquid contents of the receptacle $a$ and the vessel $h$ are permitted to come into contact and mix by way of the pores of the walls of vessel $h$ or of the holes $m$ therein, so that carbonic acid gas is developed from the salt in the receptacle $a$, to charge the liquid in the receptacle, the liquid being flavored by the acid liberated from the vessel $h$. By this means the beverage being prepared may be flavored and aerated as desired to satisfy any particular taste; and the beverage is always fresh when distributed. If a siphon $e$ is provided manual actuation of the valve $d$ permits the pressure set up by the carbonic acid to discharge any desired quantity of the drink through the nozzle $f$; or the drink may be drawn off by uncovering the opening $b$.

The foregoing description of operation refers to the embodiment of Figs. 1 and 2. The arrangement of Fig. 3, which involves the provision of means for receiving the vessel $h$, including a screw cap $i$ like that of Fig. 1, at the top of the receptacle $a$ when upright, and means for drawing off the charged drink, as a cock $n$, near the bottom of the receptacle, it will be understood that there is no need for tilting the receptacle $a$ when supplying the liquid to be charged or when inserting the vessel $b$, as the liquid may be introduced by merely removing the cap $i$ and vessel $h$ after seeing to it that the cock $n$ is closed. The receptacle $a$ need not be tilted even after the cap $i$ is screwed home and the vessel $h$ clamped in place, if the walls of the vessel are sufficiently porous to allow the contents of the vessel to pass through these walls and into the solution in the receptacle $a$.

Having thus described the said invention and how it is to be performed, what is claimed as new to be protected by Letters Patent is:

1. An apparatus for preparing and distributing aerated drinks and the like, comprising a receptacle for a liquid to be charged having a distributing opening and a second opening remote therefrom, a small vessel adapted to be inserted through and seated in the second opening and adapted to contain ingredients to charge the liquid when mixed therewith, the small vessel being open at one end and having permanent walls constructed to permit the slow passing of liquid therethrough to permit delayed communication between the liquid in the receptacle and the ingredients in the small vessel, and means to secure the small vessel in the second opening in a fluid-tight manner and to close the open end of the small vessel in a fluid-tight manner.

2. An apparatus for preparing and distributing aerated drinks and the like, comprising a receptacle for a liquid to be charged having a distributing opening and a second opening remote therefrom, a small vessel adapted to be inserted through and seated in the second opening and adapted to contain ingredients to charge the liquid when mixed therewith, the small vessel having an opening in its outer end by which the contents of the vessel may be varied, means to secure the small vessel in place on the receptacle in a fluid-tight manner and to close the opening in the small vessel's outer end in a fluid-tight manner, and a plurality of holes in the side walls of the small vessel adjacent to the outer end of the vessel and so positioned that the contents of the vessel and receptacle may be mixed, after the vessel is secured in place on the receptacle, only by tilting the receptacle.

3. An apparatus for preparing and distributing aerated drinks or other fluids, comprising a receptacle for the fluid to be charged having a distributing opening as well as another opening remote from the distributing opening, a small vessel fitted into the receptacle in the last-mentioned opening and adapted to contain a solution to be mixed with the fluid in the receptacle to charge the same, the small vessel having permeable walls and a partition wall dividing its interior into separate chambers, and means to close the vessel and secure it on the receptacle in a fluid-tight manner to preclude escape of the contents of the vessel and receptacle from the latter.

In testimony whereof I have affixed my signature in presence of two witnesses.

KARL THURE BOUVIN.

Witnesses:
 GUSTAF GERTA,
 ALEX. FOQUBERRY.

Copies of this patent may be obtained for five cents each, by addressing the "Commissioner of Patents, Washington, D. C."